United States Patent [19]

Sunakawa et al.

[11] 4,442,258

[45] Apr. 10, 1984

[54] WATER-SOLUBLE PRESSURE-SENSITIVE ADHESIVE COMPOSITION

[75] Inventors: Makoto Sunakawa; Yutaka Moroishi; Isao Mune, all of Osaka, Japan

[73] Assignee: Nitto Electric Industrial Co., Ltd., Osaka, Japan

[21] Appl. No.: 165,825

[22] Filed: Jul. 3, 1980

[30] Foreign Application Priority Data

Jul. 4, 1979 [JP] Japan .................................. 54-85292

[51] Int. Cl.$^3$ ........................... C08K 5/05; C08K 5/06
[52] U.S. Cl. ..................................... 524/767; 524/376; 524/377; 524/475; 524/762; 524/766; 524/770; 524/801; 524/832; 524/833; 524/845; 524/846
[58] Field of Search .................. 260/29.6 E, 29.6 ME, 260/29.6 TA; 524/801, 845, 846, 762, 767, 376, 475, 377, 766–770, 832, 833

[56] References Cited

U.S. PATENT DOCUMENTS

| | | | |
|---|---|---|---|
| 2,759,861 | 9/1973 | Shimokawa | 260/29.6 E |
| 2,838,421 | 6/1958 | Sohl | 428/248 |
| 3,058,940 | 10/1962 | Rees | 524/832 |
| 3,096,202 | 7/1963 | Groot von Ary | 428/352 |
| 3,758,433 | 9/1973 | Mullen | 260/29.6 E |
| 3,862,073 | 1/1975 | Sekmakas | 260/29.6 E |
| 3,891,584 | 6/1975 | Ray-Chandhope et al. | 525/63 |
| 3,931,092 | 1/1976 | Ramlow et al. | 260/33.4 R |
| 3,960,584 | 6/1976 | Savage | 260/29.6 E |
| 3,997,489 | 12/1976 | Coker | 260/28.5 R |
| 4,003,870 | 1/1977 | Gibson et al. | 524/311 |
| 4,076,677 | 2/1978 | Sekmakas | 524/832 |
| 4,128,518 | 12/1978 | Oyamada et al. | 260/29.6 E |
| 4,133,791 | 1/1979 | Kemenater et al. | 260/29.6 E |
| 4,138,381 | 2/1979 | Chang et al. | 260/29.6 E |
| 4,230,844 | 10/1980 | Chang et al. | 524/767 |
| 4,341,680 | 7/1982 | Hauber et al. | 524/560 |
| 4,388,438 | 6/1983 | Knypl et al. | 524/832 |

OTHER PUBLICATIONS

Billmeyer, "J.P. Sci. PTC", 161–178, Characterization of Molecular Wt. Distribution in High Polymers, 1965.
Erzino, "Advances in Chemistry Series", Nakajima, Polymer Molecular Weight Methods, 98–107, 1973.

*Primary Examiner*—Melvyn I. Marquis
*Assistant Examiner*—Herbert J. Lilling
*Attorney, Agent, or Firm*—Sughrue, Mion, Zinn, Macpeak and Seas

[57] ABSTRACT

A water-soluble pressure-sensitive adhesive composition is described containing a polymerization product obtained by the solution polymerization of a water-soluble ethylenically unsaturated monomer in the presence of an alcoholic plasticizer having a molecular weight of less than about 3,000 and which is a liquid at room temperature, selected from the group consisting of polyether polyols and polyhydric alcohols, wherein the polymerization product contains as a polymer component at least an addition copolymer of the water-soluble ethylenically unsaturated monomer and the alcoholic plasticizer.

19 Claims, No Drawings

WATER-SOLUBLE PRESSURE-SENSITIVE ADHESIVE COMPOSITION

BACKGROUND OF THE INVENTION

1. Field of the Invention

This invention relates to a novel pressure-sensitive adhesive composition, and more particularly to a pressure-sensitive adhesive composition which is water-soluble and which shows adhesive properties upon the application of pressure under any conditions.

2. Description of the Prior Art

Water-soluble adhesives are known in the art; for example, a so-called "gum tape", comprising a paper substrate with glue, dextrin, or polyvinyl alcohol coated thereon, is well known. Under dry conditions, however, this type of tape lacks rubber elasticity and viscosity, showing no pressure-sensitive adhesive properties. Rather such a tape shows pressure-sensitive adhesive properties only when water is applied thereon. Thus conventional water-soluble adhesives have disadvantages in that they need a complicated wetting apparatus when used for industrial applications, and when they are used on stamps and envelopes, difficulties are also encountered in wetting and applying them.

More recently, various kinds of water-soluble or water-dispersible adhesives avoiding the above described disadvantages and showing pressure-sensitive adhesive properties under various conditions have been developed. For example, U.S. Pat. No. 2,838,421, Japanese Patent Publication Nos. 34578/1975, 22768/1977 and 23813/1974 disclose such pressure-sensitive adhesives comprising a polymer component, such as a polymer containing specific carboxyl groups or a water-soluble polymer salt thereof, e.g., an alkali metal salt, an amine salt or an alkanolamine salt, and a water-soluble or water-dispersible plasticizer, such as polyether polyol, a polyhydric alcohol or an alkanolamine salt of acidic rosin.

U.S. Pat. No. 3,096,202 discloses a pressure-sensitive adhesive wherein a polyvinyl-pyrrolidone elastomer is used as the polymer component, and to this polymer component, a water-soluble plasticizer, such as polyether polyol, is added in combination with a polyfunctional polymerizable cross-linking agent, such as ethyleneglycol dimethacrylate, or an activation catalyst.

These water-soluble or water-dispersible pressure-sensitive adhesives have advantages in that they will easily adhere by the application of nothing more than manual pressure, and in that they provide strong adhesive strength immediately after application.

In this type of conventional pressure-sensitive adhesive, as described above, the component employed as the polymer has a very high polarity, and a glass transition temperature higher than room temperature, such as a carboxyl group-containing polymer or polyvinyl-pyrrolidone, in order to provide the function of water solubility, and in order to plasticize such a polymer to provide it with pressure-sensitive adhesive properties, a large amount of a water-soluble or water-dispersible liquid plasticizer having a relatively low molecular weight is incorporated. A particular problem encountered with these pressure-sensitive adhesives is poor compatibility of the polymer component with the water-soluble or water-dispersible plasticizer, and when they are stored for a long period of time, the plasticizer begins to migrate (also referred to as bleeding). When a paper material is employed as a substrate on which the adhesive is applied, the bleeding is accelerated by the affinity between the paper material and the water-soluble or water-dispersible plasticizer.

Therefore, when this type of adhesive is used, for example, in bonding original papers together or adhering pieces of paper in the paper industry, the plasticizer in the adhesives easily migrates into the paper, deteriorating the quality of the print being applied on the paper.

Water-soluble or water-dispersible pressure-sensitive adhesive have been developed as an adhesive suitable for use in the above-described applications in the paper industry. The reason for this is that the pressure-sensitive adhesive characteristics improve the adhesion, while at the same time, the water-soluble or water-dispersible characteristics render the paper easily soluble or dispersible in water upon repulping of the paper.

However, the bad print resulting from bleeding of the plasticizer which has been encountered with the conventional adhesives is a serious hindrance to the use of the adhesives in the above-described applications, greatly reducing the value of such adhesives in water-soluble or water-dispersible pressure-sensitive adhesives.

Recently it has been reported in, for example, U.S. Pat. No. 3,891,584 that graft copolymers produced by addition-polymerization of an unsaturated monomer, such as vinyl acetate, vinyl propionate or vinyl butyrate, with a high molecular weight water-soluble polymer, such as polyethylene glycol having a molecular weight of about 3,000 to about 20,000, can be used in providing an adhesive with suitable water-dispersion characteristics.

In producing these graft copolymers from a water-soluble polymer and an unsaturated monomer, a bulk polymerization method is employed in copolymerizing the unsaturated monomer, in order to minimize the formation of homopolymers, and the graft copolymers so formed are high molecular weight polymers in the gel form. Therefore, although these graft copolymers can be compounded with rosin or its derivative, or a viscous resin such as a cumarone-indene resin to obtain hot melt adhesives, they cannot be employed at all for the production of the pressure-sensitive adhesive of this invention. In addition, the water-dispersion characteristics obtained by the choice of the unsaturated monomer are unsatisfactory.

SUMMARY OF THE INVENTION

An object of this invention is to provide a novel water-soluble pressure-sensitive adhesive which is free from the above described defects of the prior art adhesives.

This object is attained by employing a polymerization product obtained by the solution polymerization of a water-soluble ethylenically unsaturated monomer, alone or in combination with a water-insoluble ethylenically unsaturated monomer copolymerizable with the water-soluble ethylenically unsaturated monomer, in the presence of a plasticizer selected from the group consisting of polyetherpolyols and polyhydric alcohols having a molecular weight of less than about 3,000 and which is liquid at room temperature.

It has been found that by employing such a low molecular weight alcoholic plasticizer which is liquid at room temperature, and which is well known in the field of pressure-sensitive adhesives, in place of the previously described water-soluble polymer, and by polymerizing an unsaturated monomer including at least a water-soluble ethylenically unsaturated monomer in the presence of the alcoholic plasticizer and a solvent, such as water and an organic solvent, a polymer component comprising an addition copolymer of the unsaturated monomer and the alcoholic plasticizer is obtained, as well as a homopolymer of the unsaturated monomer. The addition copolymer and homopolymer are provided with appropriate molecular weights and are formed in an appropriate ratio, such that the polymer component comprising the addition copolymer and the homopolymer possesses pressure-sensitive adhesive characteristics and improved solubility in water.

In addition, it has been found that since the polymer component contains the addition copolymer of the alcoholic plasticizer and the unsaturated monomer, when an additional water-soluble plasticizer is added to the polymer component, the compatibility of the additional water-soluble plasticizer with the polymer component is very good, and the bleeding of the plasticizer encountered with conventional water-soluble or water-dispersible pressure-sensitive adhesives is greatly reduced.

Therefore this invention provides a water-soluble pressure-sensitive adhesive composition comprising a composition obtained by the solution polymerization of a water-soluble ethylenically unsaturated monomer, alone or in combination with a water-insoluble ethylenically unsaturated monomer copolymerizable with the water-soluble ethylenically unsaturated monomer, in the presence of a plasticizer selected from the group consisting of polyetherpolyols and polyhydric alcohols (also referred to herein as the alcoholic plasticizers) having a molecular weight of less than about 3,000 and which is liquid at room temperature, wherein said composition contains as a polymer component at least an addition copolymer of the unsaturated monomer and the alcoholic plasticizer, and, if desired, another water-soluble plasticizer and a polyfunctional compound.

DETAILED DESCRIPTION OF THE INVENTION

In this invention, alcoholic plasticizers having average molecular weights of less than about 3,000 and which are liquid at room temperature are employed. Preferably the alcoholic plasticizers have a molecular weight of less than about 2,000, and especially preferably they have a molecular weight of less than about 1,000.

Alcoholic plasticizers having average molecular weights of more than 3,000 do not provide satisfactory pressure-sensitive adhesive properties. For obtaining satisfactory pressure-sensitive adhesive properties, it is required to increase markedly the amount of the alcoholic plasticizer added or the amount of the water-soluble plasticizer added after the solution polymerization. This is likely to cause the bleeding of the plasticizer. Furthermore, in the method of this invention employing a solution polymerization technique in which the chain transfer occurs with ease, the use of such high average molecular weight plasticizers decreases the amount of the alcoholic plasticizer-unsaturated monomer addition copolymer formed to an extent more than is desirable.

The term "chain transfer" used in this invention is explained as follows.

In general, the chain transfer of radical occurs to monomer, solvent, polymer, plasticizer, polymerization initiator and the like. In this invention, radical is formed due to the chain transfer of plasticizer, resulting in the polymerization or the coupling of the polymer into the radical, and as a result, the addition polymer is obtained. Where high average molecular weight plasticizers having small number of molecules are used as described above, the probability of chain transfer occurring at the terminal carbon of the plasticizer is small and the amount of addition polymer produced decreases. Further, due to the use of solvent in the solution polymerization it is necessary to consider the chain transfer to solvent, and from this point the use of high average molecular weight plasticizers is disadvantageous.

On the other hand, the use of alcoholic plasticizers having average molecular weights of less than about 3,000 eliminates the above-described defects, and improves the solubility of the alcoholic plasticizer itself or the adhesive formed in water. For providing the pressure-sensitive adhesive properties, it is required that the alcoholic plasticizer be a liquid at room temperature.

The alcoholic plasticizer is selected from the group consisting of polyetherpolyols and polyhydric alcohols. In particular, those alcoholic plasticizers are chosen which are less vaporizable in the air and are able to provide pressure-sensitive adhesive properties under a broad range of conditions.

It has been found that polyetherpolyols containing an ether bond or bonds in the molecule and primary or secondary hydroxy groups at the terminal thereof, produced by polymerizing propylene oxide or ethylene oxide, are suitable as the alcoholic plasticizer of this invention, and that in particular, polyetherpolyols produced by polymerizing (adding) propylene oxide or ethylene oxide with hydroxyl groups of polyhydric alcohols (that is, containing at least 3 hydroxyl groups) exhibit the most suitable characteristics. The representative example of this polymerization (addition) aspect is shown below.

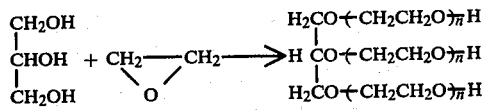

Examples of these polyhydric alcohols include glycerin, trihydroxyisobutane, erythrite, pentaerhthrite, xythrite, adonite, allodulcit, and sorbite.

Examples of polyetherpolyols of this type available commercially include Sunnix TP-400, GP-600, GP-1000, GP-3000, GEP-2800, and SP-750, all produced by Sanyo Chemical Industries Co., Ltd. The numbers indicate the average molecular weights of the polyetherpolyols.

Ordinary polyetherpolyols such as polyethyleneglycol, polypropyleneglycol or a copolymer of ethylene oxide and propylene oxide can also be used. The above described polyhydric alcohols can also be used alone.

The amount of the alcoholic plasticizer being added greatly influences the amount of the addition copolymer formed, the adhesive characteristics, and so forth. Though the most suitable amount varies depending upon the kind of the unsaturated monomer being used, the kind of the solvent, etc., it is generally used in an amount from about 20 to 400 parts by weight per 100 parts by weight of the unsaturated monomer, and preferably is from 50 to 300 parts by weight.

When the amount of the alcoholic plasticizer being added is extremely small, the amount of the addition copolymer formed is reduced and the compatibility of the formed addition copolymer with the alcoholic plasticizer cannot be improved. On the other hand, when the alcoholic plasticizer is used in an extremely large amount, the molecular weight of the addition copolymer formed is decreased, although it is formed in a larger amount. This leads to a decrease in the pressure-sensitive adhesive characteristics, particularly cohesive strength.

If an organic solvent is used as the solvent of this invention, the chain transfer to the organic solvent takes place with ease during the solution polymerization. In this case, therefore, it is desired that the alcoholic plasticizer be added in a larger amount, within the above range, than when water is used as the solvent.

The unsaturated monomer to be used in this invention should include at least one water-soluble ethylenically unsaturated monomer in order to increase the solubility of the adhesive obtained in water. Representative examples of suitable water-soluble ethylenically unsaturated monomers are those ethylenically unsaturated monomers containing a carboxyl group or groups in the molecule, such as acrylic acid, methacrylic acid, crotonic acid, maleic acid, fumaric acid, itaconic acid, monoalkylmaleic acid, monoalkyl fumaric acid, monoalkylitaconic acid and the like.

Other useful water-soluble ethylenically unsaturated monomers include vinylpyrrolidone, acrylamide, and unsaturated monomers represented by the formulae (1) and (2):

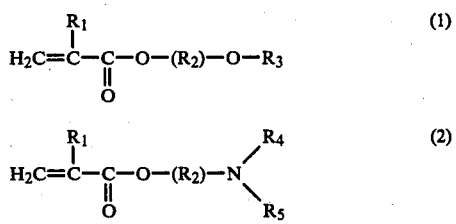

where $R_1$ is hydrogen or a methyl group, $R_2$ is a lower alkylene group, and $R_3$, $R_4$ and $R_5$ are each hydrogen or a lower alkyl group.

These water-soluble ethylenically unsaturated monomers can be used alone. However, it is preferred that they be used in combination with the above-described carboxyl group-containing unsaturated monomers.

The water-soluble ethylenically unsaturated monomer may be used in combination with water-insoluble ethylenically unsaturated monomers which are copolymerizable with the water-soluble ethylenically unsaturated monomer. These water-insoluble ethylenically unsaturated monomers are used to improve the adhesive characteristics, for example, to increase the cohesive strength, of the adhesive.

Preferred examples of water-insoluble ethylenically unsaturated monomers are alkyl acrylate or alkyl methacrylate containing 14 or less carbon atoms, vinyl acetate, dialkyl esters or dibasic unsaturated acids, such as maleic acid, fumaric acid or itaconic acid, containing 8 or less carbon atoms, and the like. In addition, vinyl propionate, acrylonitrile, styrene, etc., can be used.

The water-insoluble ethylenically unsaturated monomer is chosen depending upon the kinds of water-soluble ethylenically unsaturated monomer, alcoholic plasticizer, and solvent being used. For example, where acrylic acid or methacrylic acid is polymerized in water in the presence of a polyetherpolyol having secondary hydroxyl groups at the terminals thereof, it is preferred that lower alkyl esters, such as ethyl acrylate, butyl acrylate, 2-ethylhexyl acrylate, butyl methacrylate, vinyl acetate, and the like are used.

The amount of the water-insoluble ethylenically unsaturated monomer varies greatly depending upon the kind of solvent used, and it also varies slightly depending upon the application of the adhesive, the kind of the water-soluble ethylenically unsaturated monomer and/or alcoholic plasticizer being used, and so forth. It is not desirable for the amount of the water-insoluble ethylenically unsaturated monomer to exceed 85% by weight, based upon the total weight of the water-soluble ethylenically unsaturated monomer and the water-insoluble ethylenically unsaturated monomer. If the water-insoluble ethylenically unsaturated monomer is used in an amount greater than 85% by weight, the solubility of the adhesive obtained in water is greatly reduced, and the compatibility of the polymer component and the plasticizer is also reduced. This is likely to cause the bleeding of the plasticizer, and is undesirable. In general, when water is used as the solvent, it is usually used in an amount of less than 25% by weight, whereas when a solvent containing an organic solvent is employed, water-soluble ethylenically unsaturated monomer is preferably used in an amount of less than 75% by weight.

In the polymerization of this invention, the use of the solvent is essential. When the polymerization is carried out without using any solvent, the addition polymerization proceeds excessively, increasing the molecular weight of the addition copolymer to be obtained. Finally, the addition copolymer gels with ease, making it difficult to obtain polymers having desirable pressure-sensitive adhesive characteristics. That is to say, the solvent acts effectively as a chain transfer agent and produces addition copolymer and homopolymer having appropriate molecular weights in an appropriate ratio.

Solvents which can be used in this invention include water and aqueous mediums consisting of water and a water-soluble organic solvent, such as methanol, ethanol, isopropanol, acetone, and methylethyl ketone. In place of these solvents, water less-soluble or insoluble organic solvents, such as benzene, toluene and ethyl acetate, and the above water-soluble organic solvents may be used alone or in admixture with each other.

The solvent is chosen depending upon whether a water-insoluble unsaturated monomer is used as a part of the unsaturated monomer, and on the amount of the water-insoluble unsaturated monomer being added. The use of the organic solvent offers the advantage that the molecular weight of the polymer obtained can be easily controlled. On the other hand, when the aqueous medium, particularly water, is used alone, it is advantageous that pollution encountered in producing the adhesive or using it can be more easily controlled.

The amount of solvent added has a great influence on the adhesive characteristics, compatibility of the polymer and the plasticizer, and the polymerization workability. When the amount of solvent is reduced excessively, gelation takes place, reducing the adhesive characteristics and workability. On the other hand, the use of a large amount of solvent reduces markedly the amount of the addition polymer to be formed and deteriorates the adhesive characteristics and the compatibility of the polymer with the plasticizer.

In general, the amount of the solvent used is from about 5 to 1000 parts by weight per 100 parts by weight of the unsaturated monomer, with a range of from 20 to 600 parts by weight being preferred. The suitable amount varies greatly depending upon the kind of the solvent. For example, when water is used alone as the solvent, the amount of the water used is usually from about 50 to 1000 parts by weight, and preferably is from 100 to 600 parts by weight. When an organic solvent is used alone or in a mixture with water, it is usually from about 5 to 500 parts by weight, and preferably is from 20 to 300 parts by weight, which is much lesser than with the use of water. In determining the amount of the solvent, it is desirable to take into consideration the particular kinds of the alcoholic plasticizer, unsaturated monomer, and polymerization initiator being used, and the amounts thereof.

In polymerizing the ethylenically unsaturated monomer in the presence of the alcoholic plasticizer by use of the solvent as described above, an appropriate radical polymerization initiator is used in an amount of from about 0.05 to 2 parts by weight per 100 parts by weight of the unsaturated monomer. The polymerization is usually carried out for a period of from about 6 to 12 hours at a temperature of 60° to 80° C.

When the solution polymerization is carried out in an aqueous medium, polymerization initiators comprising persulfates, such as ammonium persulfate and potassium persulfate, hydrogen peroxide, and redox catalysts comprising persulfate or hydrogen peroxide and sodium hydrogensulfite, sodium ascorbate, a metal salt, or the like have been found to be most suitable for producing the desired addition copolymer; and organic peroxides, such as dibenzoyl peroxide, have been found to be most suitably usable in the organic solvent. As necessary, the persulfates and hydrogen peroxide may be used in the polymerization using the organic solvent, and in the polymerization using the aqueous medium, the organic peroxide may be used.

On the other hand, azo compounds which are commonly used as a polymerization initiators in polymerization reactions, are not suitable in both the aqueous medium and the organic solvent, and the desired adhesive characteristics and compatibility cannot be obtained.

The thus-obtained polymerization product contains as the polymer component the addition copolymer resulting from the addition polymerization of the unsaturated monomer and the alcoholic plasticizer, and the homopolymer of the unsaturated monomer. The polymerization product itself exhibits pressure-sensitive adhesive properties and good solubility in water, and therefore it can be used as a water-soluble pressure-sensitive adhesive as is.

However, when a large amount of the water-insoluble ethylenically unsaturated monomer is employed as the unsaturated monomer, the solubility of the polymerization product in water is sometimes somewhat reduced. In this case, an appropriate procedure, as described below, can be applied to increase the solubility.

Where a carboxyl group-containing unsaturated monomer is used as a part or all of the water-soluble ethylenically unsaturated monomer, the most common procedure to increase the solubility of the polymerization product is to ionically crosslink with a metal ion or amine through some of the carboxyl groups. This ionical crosslinking can be achieved by adding a solution containing a predetermined metal ion or amine to the reaction solution after the polymerization has been carried out. If necessary, the solution may be added to the reaction solution prior to the polymerization. The term "ionical crosslinking" used in this invention means neutralization or salt formation. Therefore, in the case of containing a large amount of a water-insoluble ethylenically unsaturated monomer, there is the advantage that the water solubility increases by the ionical crosslinking (neutralization).

This ionical crosslinking not only improves the solubility of the polymerization product in water, but also improves its adhesive characteristics, particularly shear adhesive and cohesive properties. Therefore, even when the adhesive obtained possesses a sufficient solubility in water, the ionical crosslinking procedure can be employed to improve the adhesive characteristics.

Metal ions and amines which can be used in the ionical crosslinking include univalent metal ions and amines, such as a potassium ion, a sodium ion, hexylamine and monoethanol amine. For improving the adhesive characteristics, divalent or trivalent metal ions and diamines, such as a calcium ion, a magnesium ion, a zinc ion, a copper ion, an aluminum ion, and hexamethylenediamine, are especially useful. In addition, polyvalent amines such as tetramethylenehexamine and triethylenepentamine can be used, if necessary.

The amount of the univalent metal ion or monoamine being used can usually be varied from about 0.01 to 0.8 equivalent, based upon the equivalents of carboxyl group contained in the polymer component, with the range of 0.02 to 0.6 equivalent being preferred. It is not desired to increase the amount because it may deteriorate the compatibility of the polymer with the plasticizer.

In the case of the di- or trivalent metal ions or diamines, it can usually be 0.002 to 0.05 equivalent per carboxyl group contained in the polymer component, with the range of 0.003 to 0.03 equivalent being preferred. It is not preferred to increase the amount because it may deteriorate the solubility in water.

When the polymerization product has somewhat poor pressure-sensitive adhesive characteristics, an additional plasticizer can be added after the polymerization reaction. As this additional plasticizer, it is desirable to use polyetherpolyols and polyhydric alcohols, having the same structure as those for use in the polymerization reaction.

The incorporation of such an additional plasticizer causes no bleeding, because of good compatibility of the plasticizer with the polymer. However, it is not suitable to add the additional plasticizer in an amount in excess of 700 parts by weight per 100 parts by weight of the unsaturated monomer used in the polymerization reaction, since then bleeding may take place irrespective of good compatibility.

To the polymerization product can be added a polyfunctional compound to crosslink the polymers through the functional groups contained therein so that the moisture resistance and the adhesive characteristics, particularly cohesive strength be improved.

When the water-soluble or water-dispersible pressure-sensitive adhesive is used in bonding or sticking papers in the paper industry, it is usually applied at very high temperatures and humidities. Under these conditions, the adhesive absorbs water and softens, resulting in a marked reduction in the creep strength of the adhesive, and in the cohesive failure of the adhesive even by application of only low strength. This causes various problems in the paper industry. Therefore, the water-soluble pressure-sensitive adhesive is also required to have a certain extent of water resistance and moisture resistance.

This invention can provide adhesives capable of complying with the requirements as described since incorporation of the polyfunctional compound into the adhesive of this invention enables to increase its moisture resistance and cohesive strength.

Polyfunctional compounds which can be used for this purpose include an epoxy resin, a melamine compound, a reactive phenol resin, a chelate compound of a polyvalent metal, and the like. The appropriate one is chosen depending upon the kind of the unsaturated monomer to be used.

A suitable epoxy resin is triglycidyl isocyanurate; in addition, an aliphatic glycidyl ester type, an aliphatic glycidyl ether type, a bisphenol type and an aliphatic type of low molecular weight epoxy compounds containing terminal 1.2-epoxy groups can also be used. Representative examples of the epoxy resins on the market are Epikote #828, #1031, produced by Ciba Geigy Co., Epon #834 produced by Shell Co., ECN #1235 produced by Ciba Geigy Co., TEPIC produced by Nissan Chemical Co., Ltd., and the like.

Suitable examples of the melamine compounds are melamine or its derivatives, such as polymethylolmelamine, e.g., mono-, di-, tri-, tetra-, penta- or hexamethylolmelamine, and alkoxy methylmelamine, e.g., trimethoxy methylmelamine or tributoxy methylmelamine.

A representative example of the reactive phenol resins on the market is Takirule #201 produced by Sumitomo Chemical Co., Ltd.

Suitable examples of the polyvalent metal chelate compounds are titanium acetylacetonate, ammonium titanium lactate and the like.

The amount of the polyfunctional compound compounded is usually from about 0.01 to about 2.0 parts by weight per 100 parts by weight of the unsaturated monomer used. The use of an excess of the polyfunctional compound may reduce the solubility of the adhesive in water.

The water-soluble pressure-sensitive adhesive composition of this invention can contain, as necessary, well known additives such as a coloring agent, a filler, and an antiaging agent. In addition, if desired, natural or synthetic polymers such as polyvinyl alcohol, carboxymethyl cellulose, polyacrylic acid and glue can be added as water-soluble adhesion providing agents.

The addition of the water-soluble adhesion providing agent mainly increases the shear adhesive properties. However, if it is added in a large amount, the compatibility of the polymer with the plasticizer may be reduced. Thus the amount of the water-soluble adhesion-providing agent is usually 5 to 30 parts by weight per 100 parts by weight of the unsaturated monomer used in the polymerization reaction, with the range of 10 to 20 parts by weight being preferred.

The water-soluble pressure-sensitive adhesive of this invention, as apparent from the above description, exhibits pressure-sensitive adhesive properties under any conditions and is soluble in water. The use of the water-soluble pressure-sensitive adhesive of this invention reduces greatly the bleeding of the plasticizer encountered with the prior art adhesives because it has excellent compatibility of the water-soluble plasticizer with the polymer component. In addition, it has advantages in that its pressure-sensitive adhesive characteristics deriving from the good compatibility and its stability as an adhesive are improved and in that its adhesive characteristics at low temperatures are increased.

By coating the adhesive composition of this invention on one or both surfaces of a water-soluble or water-dispersible tape-like substrate of Japanese paper, rayon or unwoven fabric, there can be obtained a pressure-sensitive adhesive tape which is very suitable for use in the paper industry. This tape creates no problems such as bad print. In addition, the adhesive composition of this invention can suitably be used in producing a label, a tape for fixing napkin, or the like products. Furthermore, it can be used in usual applications as a pressure-sensitive adhesive; for example, an adhesive tape or sheet prepared by coating the adhesive composition of this invention on one or both surfaces of a tape or sheet of polyvinyl chloride, polyethylene, polypropylene or polyethylene laminated paper has the advantage that in removing the tape or sheet after the adhesion thereof on a substrate, it can easily be removed with water although leaving the adhesive on the surface of the substrate.

The following examples are given to explain this invention in greater detail, although this invention is not intended to be limited thereby. Various variations and modifications can be made within the scope not departing from the technical concept of this invention. All parts are by weight unless otherwise indicated.

EXAMPLE 1

A mixture of 50 parts of polyetherpolyol (Sanix SP-750, produced by Sanyo Chemical Industries Co.) and 1 part of potassium persulfate was dissolved in 300 parts of water, and 100 parts of acrylic acid was added thereto. The resulting mixture was charged to a 1 liter flask equipped with a stirrer, a thermometer, a reflux condenser and a nozzle for introduction of nitrogen gas, and it was then polymerized with stirring for 8 hours while keeping the temperature at 60° C. in a nitrogen stream.

The thus-obtained reaction solution was a clear solution having a high viscosity of 10,000 poises when measured with a B-type rotary viscometer (produced by Tokyo Keiki Co.) at 2 r.p.m. A part of the solution was dried, and free polyetherpolyol was extracted therefrom with benzene. Examination of the addition ratio of polyetherpolyol and acrylic acid from the above extracted amount indicated that 90% of the polyetherpolyol charged reacted with acrylic acid.

Then, 55 parts of Sanix SP-750 was added to 100 parts of the above solution to give a water-soluble pressure-sensitive adhesive composition of this invention.

EXAMPLE 2

To 100 parts of the polymer solution obtained by the method of Example 1 were added an aqueous solution prepared by dissolving 2.1 parts of potassium hydroxide (0.125 equivalent per carboxyl group) in 20 parts of water and 55 parts of Sanix SP-750 to give a water-soluble pressure-sensitive adhesive composition of this invention.

COMPARATIVE EXAMPLE

A mixture of 100 parts of acrylic acid and 2 parts of potassium persulfate was dissolved in 300 parts of water, and the resulting solution was charged to a 1 liter flask equipped with a stirrer, a thermometer, a reflux condenser and a nozzle for introduction of nitrogen gas.

It was then polymerized with stirring for 8 hours while keeping the temperature at 60° C. in a nitrogen stream.

To the thus-obtained polymer solution were added an aqueous solution prepared by dissolving 9.7 parts of potassium hydroxide (0.125 equivalent per carboxy group) in 50 parts of water and 300 parts of Sanix SP-750 to give a water-soluble pressure-sensitive adhesive composition.

The adhesive compositions obtained in Examples 1 and 2, and the comparative adhesive composition obtained in Comparative Example were subjected to the following tests. The results are shown in Table 1.

Sticking Test

An adhesive composition was coated on one surface of a stainless steel plate. On the thus coated surface was placed a cylindrical stainless steel weight of a diameter of 5 mm and a weight of 1.5 g at a speed of 300 mm/min. After 5 seconds the cylindrical stainless steel weight was elevated vertically at a speed of 300 mm/min., and the adhesion strength (g) was measured by use of Tensilon UTM-III (produced by Toyo Boldwin Co.).

Peel Strength Test

On one surface of a 25μ thick polyester film was coated an adhesive composition to give an adhesive tape of a width of 25 mm. This adhesive tape was bonded to a thick glossy paper by use of 2 Kg loaded rollers. After being allowed to stand for 20 minutes, the bonded member was subjected to a 180° C. tensile test at a tensile speed of 300 mm/min. on a Shopper type tension tester (produced by Tsuchijima Manufacturing Co.).

Solubility Test

On both surfaces of a Japanese paper was coated an adhesive composition to give a 20 mm×200 mm adhesive tape piece. This tape piece was placed in 300 cc. of water of pH 2 or pH 12 maintained at 20°±2° C. and the water was stirred with a mixer for one minute. Thereafter the water was made to flow over a filter paper. When there remained no piece on the filter paper and the filtrate was clear, the solubility of the adhesive composition was indicated by (O), and when there remained a small piece or the filtrate was milky, it was indicated by (X).

Compatibility Test

The same 20 mm×200 mm adhesive tape piece as used in Solubility Test was prepared and interposed between two sheets of high quality paper (weight: 45 g/m²; Thickness: 30μ) to give a sandwiched structure. This member was allowed to stand under a load of 600 g/cm in a desiccator adjusted to a temperature of 30°±2° C. and a humidity of 90 3% R.H. for 7 days. Then the member was taken out of the desiccator, and the migration of the plasticizer contained in the adhesive into the high quality paper (bleeding) was examined. As indicated in the following Table 1, where no migration was observed the compatibility of the adhesive composition is indicated by (O), where a slight migration was observed it is indicated by (Δ), and the symbol (X) indicates substantial migration of the plasticizer into the surface of the paper.

TABLE 1

|  | Example 1 | Example 2 | Comparative Example |
|---|---|---|---|
| Sticking (g) | 80 | 95 | 25 |
| Peel Strength (g/25 mm) | 720 | 1050 | 650 |
| Solubility |  |  |  |
| pH 2 | O | O | O |
| pH 12 | O | O | O |
| Compatibility | O | O | X |

EXAMPLE 3

The procedure of Example 1 was repeated wherein 90 parts of acrylic acid and 10 parts of n-butyl acrylate were used in place of 100 parts of acrylic acid and 2 parts of ammonium persulfate was used in place of 1 part of potassium persulfate.

To the thus obtained polymer solution was added 300 parts of Sanix SP-750 and the ion crosslinking agents as shown below to give three kinds of water-soluble pressure-sensitive adhesive compositions.

Ion Crosslinking Agents

No. 1 An aqueous solution of 7 parts (0.1 equivalent per carboxyl group) of potassium hydroxide and 50 parts of water No. 2 An aqueous solution of 0.28 part (0.005 equivalent per carboxyl group) of aluminum chloride and 30 parts of water No. 3 An aqueous solution of 13.14 parts (0.1 equivalent per carboxyl group) of diethanolamine and 30 parts of water

EXAMPLE 4

To 100 parts of the adhesive composition prepared by adding No. 1 in Example 3 was added 0.2 part of a 10% aqueous solution of a water-soluble trifunctional polyepoxide: triglycidyl isocyanurate (epoxy equivalent 99) to form a water-soluble pressure-sensitive adhesive composition of this invention.

The adhesive compositions of Example 3 and 4 were subjected to the same tests as in the foregoing examples and to cohesive strength, shear adhesive strength and moisture resistance tests. The results are shown in Table 2.

The cohesive strength, shear adhesive strength and moisture resistance tests were conducted as follows:

Cohesive Strength Test

An adhesive composition was coated on one surface of a 25μ thick polyester film to provide a 10 mm×20 mm adhesive tape piece. This tape piece was sticked onto a Bakelite plate, and 500 g of load was applied on the tape piece in the vertical direction. After one hour, the distance that the tape piece travelled downwards was measured.

Shear Adhesive Strength Test

On both surfaces of an unwoven cloth was coated an adhesive composition to provide a 20 mm×20 mm adhesive tape piece. This adhesive tape piece was interposed between 2 sheets of thick glossy paper and bonded together in the sandwiched structure, and its shear adhesive strength was measured at a tensile speed of 300 mm/min. in a box heated at the predetermined temperature.

Moisture Resistance Test

On both surfaces of an unwoven cloth was coated an adhesive composition to provide a 20 mm×20 mm adhesive tape piece. This adhesive tape piece was interposed between two sheets of high quality paper (weight: 60 g/m$^2$; thickness: 50μ) and bonded together in the sandwiched structure. This member was placed under a load of 50 g in a box into which steam was always blown, and the time at which the high quality paper dropped was measured.

TABLE 2

|  | Example 3 |  |  | Example 4 |
|---|---|---|---|---|
|  | No. 1 | No. 2 | No. 3 |  |
| Sticking (g) | 92 | 81 | 93 | 98 |
| Peel Strength (g/25 mm) | 960 | 880 | 980 | 1000 |
| Cohesive Strength (mm) | 0.04 | 0.04 | 0.08 | 0.05 |
| Shear Adhesive* Strength (Kg/20 × 20 mm) |  |  |  |  |
| 20° C. | 28.2 | 28.2 | 28.8 | 27.9 |
| 100° C. | 26.4 | 26.0 | 26.0 | 26.2 |
| 150° C. | 25.0 | 24.8 | 24.5 | 25.2 |
| Solubility |  |  |  |  |
| pH 2 | O | O | O | O |
| pH 12 | O | O | O | O |
| Compatibility | O | O | O | O |
| Moisture Resistance (min.) | 50 | 46 | 50 | more than 400 |

*In each example, the breakage of the substrate took place at the test.

EXAMPLE 5

A mixture of 200 parts of polyethyleneglycol (average molecular weight 400), 2 parts of potassium persulfate, and 5.8 parts of sodium hydroxide (0.125 equivalent per carboxyl group) was dissolved in 300 parts of water, and 100 parts of methacrylic acid was added thereto. The resulting mixture was polymerized in the same manner as in Example 1.

The polymer solution so obtained was used as it is as a water-soluble pressure-sensitive adhesive composition of this invention. This composition was subjected to the same tests as used in the foregoing examples.

The results are as follows:

| Sticking | 85 g |
|---|---|
| Peel Strength | 850 g/25 mm |
| Cohesive Strength | 0.10 mm |
| Shear Adhesive Strength |  |
| 20° C. | 29.1 Kg/20 × 20 mm (substrate broken) |
| 100° C. | 25.0 Kg/20 × 20 mm (substrate broken) |
| 150° C. | 14.5 Kg/20 × 20 mm (substrate broken) |
| Solubility |  |
| pH 2 | O |
| pH 12 | O |
| Compatibility | O |
| Moisture Resistance | 42 min. |

EXAMPLES 6 TO 9

The procedure of Example 1 was repeated wherein the kinds and amounts of the unsaturated monomer, the alcohol-based plasticizer and the polymerization initiator were changed as indicated in Table 3.

TABLE 3

| Ex. | Unsaturated Monomer (Parts) | Alcoholic Plasticizer (parts) | Polymerization* Initiator (parts) |
|---|---|---|---|
| 6 | Acrylic Acid (100) | Polyethyleneglycol having a molecular weight of 300 (150) | KPS (1) |
| 7 | Acrylic Acid (95) 2-Ethylhexyl Acrylate (5) | Sanix TP-400 (50) | APS (2) |
| 8 | Acrylic Acid (75) Vinyl Acetate (25) | Polypropyleneglycol having a molecular weight of 300 (50) | KPS (2) |
| 9 | Acrylic Acid (50) Maleic Acid (50) | Sanix TP-400 (50) | KPS (2) |

*KPS = potassium persulfate
APS = ammonium persulfate

To the thus-obtained polymer solutions the water-soluble plasticizers and ionical-crosslinking agents were added, as indicated in Table 4, to provide four kinds of water-soluble pressure-sensitive adhesive compositions of this invention. The ionical-crosslinking agents were added after being dissolved in 30 parts of water in Examples 6 to 8, and in 20 parts of water in Example 9.

TABLE 4

| Example | Water Soluble Plasticizer (parts) | Ionical-Crosslinking Agent (parts) |
|---|---|---|
| 6 | — | Potassium Hydroxide (3.9; 0.05 equivalent per carboxylic group) |
| 7 | Sanix TP-400 (150) | Sodium Hydroxide (5.3; 0.1 equivalent per carboxyl group) |
| 8 | Sanix GEP-2800 (150) | Sodium Hydroxide (2.8; 0.067 equivalent per carboxyl group) |
| 9 | Sanix TP-400 (150) | Sodium Hydroxide (5.6; 0.125 equivalent per carboxyl group) |

The thus-obtained adhesive compositions were subjected to the same tests as used in the foregoing examples.

The results are shown in Table 5.

TABLE 5

|  | Example 6 | Example 7 | Example 8 | Example 9 |
|---|---|---|---|---|
| Sticking (g) | 85 | 90 | 83 | 90 |
| Peel Strength (g/25 mm) | 900 | 950 | 900 | 880 |
| Cohesive Strength (mm) | 0.10 | 0.05 | 0.07 | 0.11 |
| Shear Adhesive Strength* (Kg/20 × 20 mm) |  |  |  |  |
| 20° C. | (27.8) | (29.0) | (28.8) | (29.0) |
| 100° C. | 20.0 | (26.2) | (25.6) | 24.6 |
| 150° C. | 11.9 | (24.5) | (25.0) | 14.6 |
| Solubility |  |  |  |  |
| pH 2 | O | O | O | O |
| pH 12 | O | O | O | O |
| Compatibility | O | O | O | O |
| Moisture Resistance (min.) | 40 | 45 | 55 | 43 |

*The bracket means that the breakage of the substrate occurred.

EXAMPLES 10 TO 20

In the same manner as in Example 1, the compositions as indicated in Table 6 were polymerized in water.

The symbols used in Table 6 indicate the following compounds.

AA: Acrylic Acid
n-BA: n-Butyl Acrylate
MAA: Methacrylic Acid
iso-BA: Isobutyl Acrylate
VP: Vinylpyrrolidone
MM: Monomethyl Malate
MeEMA: 2-Methoxyethyl Methacrylate
VAC: Vinyl Acetate
APS, KPS: Same as in Table 3
BPO: Dibenzoylperoxide

TABLE 6

| Example | Unsaturated Monomer (parts) | Alcoholic Plasticizer (parts) | Water (parts) | Polymerization Initiator (parts) |
|---|---|---|---|---|
| 10 | AA (85) n-BA (15) | Sanix SP-750 (200) | 500 | APS (1) |
| 11 | MAA (75) iso-BA (25) | Sanix GP-400 (100) | 100 | H$_2$O$_2$ (0.1) Sodium Ascorbate (0.05) |
| 12 | AA (80) VP (10) MM (10) | Sanix SP-750 (200) Pentaerthlite (50) | 600 | APS (0.5) |
| 13 | AA (65) MeEMA (30) VAC (5) | Sanix SP-750 (20) | 50 | APS (0.05) |
| 14 | AA (100) | Sanix GP-250 (200) | 200 | KPS (0.5) |
| 15 | AA (100) | Sanix GP-400 (100) | 200 | KPS (0.5) |
| 16 | AA (100) | Sanix GP-600 (100) | 200 | KPS (0.5) |
| 17 | AA (100) | Sanix GP-1000 (100) | 200 | KPS (0.5) |
| 18 | AA (100) | Sanix GP-300 (100) | 200 | KPS (0.5) |
| 19 | AA (95) iso-BA (5) | Sanix SP-750 (100) | 100 | APS (2.0) |
| 20 | AA (60) MM (30) n-BA (10) | Sanix GP-600 (150) | 200 | BPO (0.1) |

To the thus-obtained polymer solutions were added the polyfunctional compounds, the water-soluble plasticizers and the ionical-crosslinking agents as indicated in Table 7 to provide 11 kinds of water-soluble pressure-sensitive adhesive compositions of this invention. The ionical-crosslinking agents were added in the state of aqueous solution, and the figures in Table 7 indicate the number of equivalents per carboxyl group contained in the polymer component.

TABLE 7

| Example | Polyfunctional Compound (parts) | Water-Soluble Plasticizer (parts) | Ionical-Crosslinking Agent (equivalent) |
|---|---|---|---|
| 10 | Trimethoxy Methylmelamine (0.5) | Sanix SP-750 (200) | KOH (0.25) |
| 11 | — | Sanix GP-400 (50) | — |
| 12 | TEPIC | — | NaOH (0.02) |
| 13 | — | Sanix SP-750 (500) | Ethanolamine (0.3) |
| 14 | Trimethoxy Methylmelamine (0.03) | Sanix GP-250 (50) | KOH (0.12) |
| 15 | Trimethoxy Methylmelamine (0.03) | Sanix GP-400 (100) | " |
| 16 | Trimethoxy Methylmelamine (0.03) | Sanix GP-600 (200) | " |
| 17 | Trimethoxy Methylmelamine (0.03) | Sanix GP-600 (300) | " |
| 18 | Trimethoxy Methylmelamine (0.03) | Sanix GP-1000 (500) | " |
| 19 | — | Sanix SP-750 (100) | Hexamethylenediamine (0.03) |
| 20 | Trimethoxy Methylmelamine (0.1) | Sanix GP-600 (50) | KOH (0.1) |

All of the thus-obtained water-soluble pressure-sensitive adhesive compositions exhibited good pressure-sensitive adhesive characteristics like the compositions of Examples 1 to 9, and their solubilities in water and compatibility of polymer with plasticizer were satisfactory. In this explanation, only the test results of compatibility, which are considered to be the most important effect of this invention, are disclosed, and other test results about adhesive characteristics are omitted.

In measuring the compatibility, specimens were allowed to stand in an atmosphere of 35° C. and 80% RH, and the migration of the plasticizer was examined with a laspe of time. The other tests were conducted in the same manner as in the foregoing examples.

The results are shown in Table 8.

For comparison, adhesive compositions were prepared in the same manner as in Comparative Example from the compositions corresponding to those of Examples 10 to 20. The results obtained are shown in brackets in Table 8.

TABLE 8

| Example and Corresponding Comparative Example ( ) | Time for which specimens were allowed to stand | | | | |
|---|---|---|---|---|---|
| | 1 day | 3 days | 7 days | 14 days | 30 days |
| 10 | O (O) | O (X) | O (X) | O (X) | O (X) |
| 11 | O (O) | O (X) | O (X) | Δ (X) | Δ (X) |
| 12 | O (O) | O (O) | O (X) | O (X) | Δ (X) |
| 13 | O (O) | O (X) | O (X) | O (X) | O (X) |
| 14 | O (X) | O (X) | O (X) | Δ (X) | Δ (X) |
| 15 | O (X) | O (X) | O (X) | Δ (X) | Δ (X) |
| 16 | O (X) | O (X) | O (X) | Δ (X) | Δ (X) |
| 17 | O (X) | O (X) | O (X) | Δ (X) | Δ (X) |
| 18 | O (X) | O (X) | O (X) | Δ (X) | Δ (X) |
| 19 | O (O) | O (O) | O (Δ) | O (X) | O (X) |
| 20 | O (O) | O (O) | O (X) | O (X) | O (X) |

EXAMPLES 21 TO 27

In the same manner as in Example 1, the compositions indicated in Table 9 were polymerized in an aqueous medium containing organic solvents.

The symbols used in Table 9 indicate the following compounds, and the other symbols are the same as in Table 6.

EA: Ethyl Acrylate
MeEA: 2-Methoxyethyl Acrylate
M: Maleic Acid

MMA: Methyl Methacrylate
OA: Octyl Acrylate

TABLE 9

| Example | Unsaturated Monomer (parts) | Alcoholic Plasticizer (parts) | Solvent (parts) | Polymerization Initiator (parts) |
|---|---|---|---|---|
| 21 | AA (80) EA (20) | Sanix SP-750 (100) | Water (50) Methyl Ethyl Ketone (50) | APS (0.2) |
| 22 | MAA (60) MeEMA (30) OA (10) | Sanix SP-750 (100) | Water (80) Isopropanol (20) | APS (1.0) |
| 23 | AA (80) EA (20) | Sanix SP-750 (100) | Water (20) Acetone (80) | APS (0.1) |
| 24 | AA (30) EA (70) | Sanix SP-750 (100) | Water (50) Methanol (50) | APS (0.3) |
| 25 | M (30) VP (5) MeEA (65) | Sanix GP-600 (100) | Water (20) Methanol (80) | BPO (0.1) |
| 26 | AA (90) MMA (10) | Sanix GP-600 (250) | Water (30) Ethanol (70) | BPO (0.1) |
| 27 | VP (100) | Sanix SP-750 (100) | Water (80) Isopropanol (20) | KPS (0.5) |

To the thus-obtained polymer solutions the polyfunctional compounds, the water-soluble plasticizers, and the ionical-crosslinking agents were added, as indicated in Table 10, to provide 7 kinds of water-soluble pressure-sensitive adhesive compositions of this invention. The ionical-crosslinking agents were added in the state of aqueous solution, and the figures in Table 10 indicate the number of equivalents per carboxyl group contained in the polymer component.

TABLE 10

| Example | Polyfunctional Compound (parts) | Water-Soluble Plasticizer (parts) | Ionical-Crosslinking Agent (equivalent) |
|---|---|---|---|
| 21 | TEPIC (0.1) | Sanix SP-750 (100) | KOH (0.25) |
| 22 | Trimethoxy Methylmelamine (0.1) | Sanix SP-750 (100) | KOH (0.25) |
| 23 | TEPIC (0.1) | Sanix SP-750 (100) | KOH (0.25) |
| 24 | TEPIC (0.1) | Sanix SP-750 (100) | KOH (0.8) |
| 25 | Trimethoxy Methylmelamine (0.1) | — | FeCl$_2$ (0.02) |
| 26 | Trimethoxy Methylmelamine (0.1) | — | KOH (0.2) |
| 27 | — | Sanix SP-750 (50) | KOH (0.2) |

These water-soluble pressure-sensitive adhesive compositions were all produced by use as a solvent of an aqueous medium containing organic solvents. They exhibited good pressure-sensitive adhesive properties similar to those of the compositions of Examples 1 to 20 which were produced by use as a solvent of water only, and their solubilities in water and compatibilities of the polymer in the composition with the plasticizer were satisfactory. In this example, only the test results of compatibility were indicated, and the other test results are omitted. The method of measuring the compatibility is the same as in Examples 10 to 20.

The results are shown in Table 11.

TABLE 11

| Example and Corresponding Comparative Example ( ) | Time for which specimens were allowed to stand | | | | |
|---|---|---|---|---|---|
| | 1 day | 3 days | 7 days | 14 days | 30 days |
| 21 | ○ (○) | ○ (○) | ○ (X) | ○ (X) | ○ (X) |
| 22 | ○ (○) | ○ (X) | ○ (X) | ○ (X) | Δ (X) |
| 23 | ○ (○) | ○ (○) | ○ (Δ) | ○ (X) | ○ (X) |
| 24 | ○ (○) | ○ (○) | ○ (Δ) | ○ (Δ) | ○ (X) |
| 25 | ○ (○) | ○ (X) | ○ (X) | ○ (X) | Δ (X) |
| 26 | ○ (○) | ○ (○) | ○ (Δ) | ○ (X) | ○ (X) |
| 27 | ○ (○) | ○ (Δ) | ○ (X) | ○ (X) | Δ (X) |

EXAMPLES 28 TO 41

The compositions as shown in Tables 12 and 13 were polymerized in the same manner as in Example 1 in organic solvents.

The meanings of the symbols used in these tables are the same as in Tables 6 and 9, and the new symbols indicate the following compounds.

2EHA: 2-Ethylhexyl Acrylate
EEMA: 2-Ethoxyethyl Methacrylate
IA: Itaconic Acid
HEA: 2-Hydroxyethyl Acrylate
EM: Monoethyl Maleate
iso-OA: Isooctyl Acrylate
DMM: Dimethyl Maleate

TABLE 12

| Example | Unsaturated Monomer (parts) | Alcoholic Plasticizer (parts) | Solvent (parts) | Polymerization Initiator (parts) |
|---|---|---|---|---|
| 28 | AA (80) EA (20) | Sanix SP-750 (100) | Methanol (100) | APS (0.2) |
| 29 | AA (80) EA (20) | Sanix SP-750 (100) | Ethanol (100) | APS (0.2) |
| 30 | AA (50) EA (30) BA (20) | Sanix SP-750 (100) | Ethyl Acetate (100) | BPO (0.1) |
| 31 | AA (40) 2EHA (60) | Sanix SP-750 (100) | Toluene (50) | BPO (0.1) |
| 32 | AA (40) 2EHA (60) | Sanix SP-750 (100) | Benzene (200) | BPO (0.1) |
| 33 | AA (10) MeEMA (90) | Sanix SP-750 (100) Glycerin (50) | Methanol (80) Toluene (20) | BPO (0.5) |
| 34 | AA (20) BA (30) MeEMA (50) | Sanix SP-750 (30) Xylite (20) | Toluene (60) Methyl Ethyl Ketone (40) | BPO (0.2) |
| 35 | AA (50) EEMA (30) 2EHA (20) | Sanix SP-750 (50) Sorbit (10) | Ethyl Acetate (100) | BPO (0.1) |

TABLE 13

| Example | Unsaturated Monomer (parts) | Alcoholic Plasticizer (parts) | Solvent (parts) | Polymerization Initiator (parts) |
|---|---|---|---|---|
| 36 | AA (20) MeEA (70) VAC (10) | Sanix TP-400 (50) | Acetone (100) | BPO (0.1) |
| 37 | AA (100) | Sanix SP-750 (100) | Ethanol (100) | BPO (0.05) |
| 38 | MAA (5) BA (5) MeEA (90) | Sanix SP-750 (100) | Ethanol (50) Toluene (50) | BPO (0.4) |
| 39 | IA (50) | Sanix GP-600 | Methanol | BPO (0.1) |

TABLE 13-continued

| Example | Unsaturated Monomer (parts) | Alcoholic Plasticizer (parts) | Solvent (parts) | Polymerization Initiator (parts) |
|---|---|---|---|---|
| 40 | HEA (20) EEMA (30) AA (40) EM (30) iso-OA (30) | Sanix SP-750 (150) | Methanol (50) Toluene (50) | BPO (0.1) |
| 41 | AA (80) DMM (20) | Sanix GP-600 (150) | Ethanol (60) Xylene (40) | BPO (0.1) |

To the thus-obtained polymer solutions the polyfunctional compounds, the water-soluble plasticizers, and the ionical-crosslinking agents were added, as shown in Table 14, to provide 14 kinds of water-soluble pressure-sensitive adhesive compositions of this invention. The ionical-crosslinking agents were added in the form of aqueous solutions, and the figures in Table 14 indicate the number of equivalents per carboxyl group contained in the polymer component.

TABLE 14

| Example | Polyfunctional Compound (parts) | Water-soluble Plasticizer (parts) | Ionical-Crosslinking Agent (equivalent) |
|---|---|---|---|
| 28 | TEPIC (0.1) | Sanix SP-750 (100) | KOH (0.25) |
| 29 | TEPIC (0.1) | Sanix SP-750 (100) | KOH (0.25) |
| 30 | Alkylphenol (0.2) | Sanix SP-750 (200) | KOH (0.25) |
| 31 | Alkylphenol (0.2) | Sanix SP-750 (50) | KOH (0.25) |
| 32 | Alkylphenol (0.2) | Sanix SP-750 (50) | KOH (0.25) |
| 33 | — | — | NaOH (0.8) |
| 34 | TEPIC (0.05) | — | Hexylamine (0.7) |
| 35 | — | Sanix SP-750 (100) | KOH (0.5) |
| 36 | — | — | KOH (0.6) |
| 37 | Tributoxy Methylmelamine (0.01) | Sanix SP-750 (100) | Calcium Acetate (0.005) |
| 38 | Triethoxy Methylmelamine (0.1) | — | Zinc Chloride (0.01) |
| 39 | Trimethoxy Methylmelamine (0.1) | — | Tin Chloride (0.01) |
| 40 | Alkylphenol Resin (0.05) | Sanix SP-750 (50) | KOH (0.5) |
| 41 | Alkylphenol Resin (0.05) | Sanix GP-600 (50) | NaOH (0.1) |

Although these water-soluble pressure-sensitive adhesive compositions were prepared by use as a solvent of organic solvents, they exhbited good pressure-sensitive characteristics substantially similar to those of the water-soluble pressure-sensitive adhesive compositions of Examples 1 to 27, which were prepared by use as a solvent of water alone or mixtures of water and organic solvents, and in addition, their solubilities in water and compatibilities of polymer with plasticizer were sufficiently satisfactory.

In this example, only the results of the compatibility test are listed, and other test results are omitted. The compatibility test was the same as that used in Examples 10 to 27, and the results are shown in Table 15.

TABLE 15

| Example and Corresponding Comparative Example ( ) | Time for which specimens were allowed to stand | | | | |
|---|---|---|---|---|---|
| | 1 day | 3 days | 7 days | 14 days | 30 days |
| 28 | ○(○) | ○(○) | ○(X) | ○(X) | △(X) |
| 29 | ○(○) | ○(○) | ○(X) | ○(X) | △(X) |
| 30 | ○(○) | ○(○) | ○(△) | ○(X) | ○(X) |
| 31 | ○(○) | ○(○) | ○(△) | ○(X) | ○(X) |
| 32 | ○(○) | ○(○) | ○(△) | ○(X) | ○(X) |
| 33 | ○(○) | ○(○) | ○(△) | ○(△) | ○(X) |
| 34 | ○(○) | ○(○) | ○(△) | ○(X) | ○(X) |
| 35 | ○(○) | ○(○) | ○(△) | ○(X) | ○(X) |
| 36 | ○(○) | ○(△) | ○(X) | ○(X) | △(X) |
| 37 | ○(○) | ○(△) | ○(X) | ○(X) | △(X) |
| 38 | ○(○) | ○(△) | ○(X) | ○(X) | ○(X) |
| 39 | ○(○) | ○(X) | ○(X) | △(X) | △(X) |
| 40 | ○(○) | ○(X) | ○(X) | △(X) | △(X) |
| 41 | ○(○) | ○(X) | ○(X) | △(X) | △(X) |

While the invention has been described in detail and with reference to specific embodiment thereof, it will be apparent to one skilled in the art that various changes and modifications can be made therein without departing from the spirit and scope thereof.

What is claimed is:

1. A water-soluble pressure-sensitive adhesive composition comprising a composition obtained by the solution polymerization of a water-soluble ethylenically unsaturated monomer in the presence of a solvent and an alcoholic plasticizer selected from the group consisting of polyether polyols and polyhydric alcohols, said alcoholic plasticizers having an average molecular weight of less than about 3,000 and which is liquid at room temperature,
   wherein said composition contains as a polymer component at least an addition copolymer of the unsaturated monomer and the alcoholic plasticizer, wherein the alcoholic plasticizer is present in an amount of from 20 to 400 parts by weight per 100 parts by weight of the unsaturated monomer.

2. A water-soluble pressure-sensitive adhesive composition of claim 1 including, in addition to the water-soluble ethylenically unsaturated monomer, a water-insoluble ethylenically unsaturated monomer copolymerizable with said water-soluble ethylenically unsaturated monomer.

3. A water-soluble pressure-sensitive adhesive composition of claim 1 or 2, wherein the solvent is selected from the group consisting of water and an aqueous solvent of water and a water-soluble organic solvent.

4. A water-soluble pressure-sensitive adhesive composition of claim 3, wherein a polymerization initiator for use in the solution polymerization is selected from the group consisting of a persulfate, hydrogen peroxide and a redox catalyst.

5. A water-soluble pressure-sensitive adhesive composition of claim 1 or 2, wherein the amount of the solvent used is from about 5 to 1,000 parts by weight per 100 parts by weight of the unsaturated monomer.

6. A water-soluble pressure-sensitive adhesive composition of claim 3, wherein the solvent is water and the amount used thereof is from about 50 to 1,000 parts by weight per 100 parts by weight of the unsaturated monomer.

7. A water-soluble pressure-sensitive adhesive composition of claim 3 or 6, wherein the solvent is selected from the group consisting of the organic solvent alone and an aqueous solvent containing the organic solvent, and the amount used thereof is from about 5 to 500 parts by weight per 100 parts by weight of the unsaturated monomer.

8. A water-soluble pressure-sensitive adhesive composition of claim 2, wherein the water-insoluble ethylenically unsaturated monomer comprises not more than 85% by weight or less of the total unsaturated monomer.

9. A water-soluble pressure-sensitive adhesive composition of claim 6, wherein the water-insoluble ethylenically unsaturated monomer comprises not more than 25% by weight of the total unsaturated monomer.

10. A water-soluble pressure-sensitive adhesive composition of claim 7, wherein the water-insoluble ethylenically unsaturated monomer comprises not more than 75% by weight of the total unsaturated monomer.

11. A water-soluble pressure-sensitive adhesive composition of claim 2, wherein the water-insoluble ethylenically unsaturated monomer is selected from the group consisting of alkylacrylate or alkylmethacrylate containing up to 14 carbon atoms, vinyl acetate and dialkyl esters of dibasic unsaturated acids.

12. A water-soluble pressure-sensitive adhesive composition of claim 1 including a water-soluble plasticizer.

13. A water-soluble pressure-sensitive adhesive composition of claim 12, wherein the water-soluble plasticizer is compounded in an amount of 700 parts by weight or less per 100 parts by weight of the unsaturated monomer.

14. A water-soluble pressure-sensitive adhesive composition of claim 12, wherein the water-soluble plasticizer is a polyether polyol or a polyhydric alcohol.

15. A water-soluble pressure-sensitive adhesive composition of claim 3, wherein the aqueous solvent is selected from the group consisting of methanol, ethanol, isoproponyl, acetone, and methylethyl ketone.

16. A water-soluble pressure-sensitive adhesive composition of claim 1 or 2, wherein the alcoholic plasticizer is present in an amount of from 50 to 300 parts by weight.

17. A water-soluble pressure-sensitive adhesive composition of claim 2, wherein the water-insoluble ethylenically unsaturated monomer is selected from the group consisting of alkylacrylate or alkylmethacrylate containing 14 or less carbon atoms, vinyl acetate, and dialkyl esters of dibasic unsaturated acids containing 8 or less carbon atoms.

18. A water-soluble pressure-sensitive adhesive composition of claim 1 or 2, wherein said alcoholic plasticizer has a molecular weight of less than about 2,000.

19. A water-soluble pressure-sensitive adhesive composition of claim 18, wherein said alcoholic plasticizer has a molecular weight of less than 1,000.

* * * * *